United States Patent [19]

Millett

[11] 4,454,512

[45] Jun. 12, 1984

[54] SECONDARY RADAR SYSTEM

[76] Inventor: Michael Millett, 79A Linden Gardens, London, W2, England

[21] Appl. No.: 233,608

[22] PCT Filed: May 23, 1980

[86] PCT No.: PCT/GB80/00093

§ 371 Date: Jan. 23, 1981

§ 102(e) Date: Jan. 23, 1981

[87] PCT Pub. No.: WO80/02601

PCT Pub. Date: Nov. 27, 1980

[30] Foreign Application Priority Data

May 23, 1979 [GB] United Kingdom ............... 7917938

[51] Int. Cl.³ .......................................... G01S 13/84
[52] U.S. Cl. .................................................. 343/12 R
[58] Field of Search ............ 343/7 PL, 5 DP, 6.8 R, 343/6.8 LC, 7 PL, 12 R, 6.5 R, 7.6; 324/83 R

[56] References Cited

U.S. PATENT DOCUMENTS

| | | | |
|---|---|---|---|
| 2,907,999 | 10/1959 | Wadley | 343/12 R |
| 3,241,139 | 3/1966 | Wadley | 343/12 R |
| 3,245,077 | 4/1966 | Graves et al. | 343/7 PL X |
| 3,290,677 | 12/1966 | Jacob | 343/12 R X |
| 3,725,920 | 4/1973 | Kupfer et al. | 343/12 R |
| 3,729,736 | 4/1973 | Hurd | 343/7 PL X |
| 3,984,771 | 10/1976 | Nossen et al. | 328/14 X |
| 4,041,490 | 8/1977 | Watt | 343/17.7 |
| 4,183,022 | 1/1980 | Baudard et al. | 343/7 PL X |
| 4,186,397 | 1/1980 | Sternberger et al. | 343/7 PL X |

FOREIGN PATENT DOCUMENTS 1079003 8/1969 United Kingdom ............. 343/7 PL

Primary Examiner—Maynard R. Wilbur
Assistant Examiner—Robert C. Burk
Attorney, Agent, or Firm—Mawhinney & Mawhinney & Connors

[57] ABSTRACT

A distance measuring system in which a first station (FIG. 1) radiates a modulated carrier wave and a second station (FIG. 2) receives that wave, and retransmits the modulation on a carrier wave back to the first station, which compares the phases of the original and received modulations. The second station includes a digital counter (19) which accumulates clock pulses denoting the period of the modulation and a second counter is incremented and decremented to reproduce the modulation for retransmission thereof.

1 Claim, 4 Drawing Figures

SECONDARY RADAR SYSTEM

BACKGROUND OF THE INVENTION

This invention relates to secondary radar systems, that is to say systems in which distances are measured by means of radiating a signal from a measuring station, which receives a return signal from an active target or reflecting station.

It is known to employ a pulse radar to interrogate an active target which, on reception of a pulse from the measuring station, transmits a pulse or, more usually, a coded reply after a predetermined time. Usually the measuring station is arranged to compute or display the range of the target. The present invention, however, employs continuous wave transmission and an indication of range is obtained by comparison of the phase of modulation of the reflected wave with the phase of similar modulation of the transmitted wave. The time of propagation of a wave retransmitted from a different reflecting object is, approximately, 1 ms per 150 Km and accordingly unambiguous measurement of the distance of the reflective object can be made by a comparison of the phases of the respective modulations provided that the frequency of transmission in kHz is less than 150 divided by the distance in kilometers. It is intended that the present invention should be used in combination with radio telephones or other forms of mobile transceivers. Accordingly, it is intended that a receiving station as described hereinafter should be part of a mobile transceiver and is operative to transmit or receive according to the state of the transmit/receive switch in the mobile transceiver. The modulation which is preferably employed in this invention is at an audio frequency and accordingly the various modulating, demodulating and amplifying circuits that would be present in a mobile receiver may be employed for the performance of the present invention. The measuring station may be similarly adapted for use in or as part of a mobile receiver, it being thereby possible for the operators of two portable or mobile transceivers to measure the distance separating them.

SUMMARY OF THE INVENTION

In one embodiment of the invention, a primary carrier wave is radiated from the measuring station and carries modulation which may be at an audio frequency. The modulation is recovered at the receiving station and is used to modulate a secondary carrier wave which is transmitted by that station for reception by the measuring station. It is desirable to ensure that the modulation is retransmitted in the same phase as it is received. The secondary carrier wave may be at the same as or at a different frequency to that of the primary carrier wave.

In order to derive, at the receiving station, a signal suitable for retransmission, the primary carrier wave may be used to derive timing pulses at the receiving station. The timing pulses may define an interval in which high frequency clock pulses can be accumulated in a counter. That interval may be reproduced for obtaining a modulating signal for the secondary carrier waves by repetitive accumulation of pulses or decrementing of pulses to the same total as is accumulated during timing intervals. A signal which is produced each time the said total is reached may constitute the modulation of the secondary wave.

DESCRIPTION OF THE PREFERRED EMBODIMENTS

Figure 1:
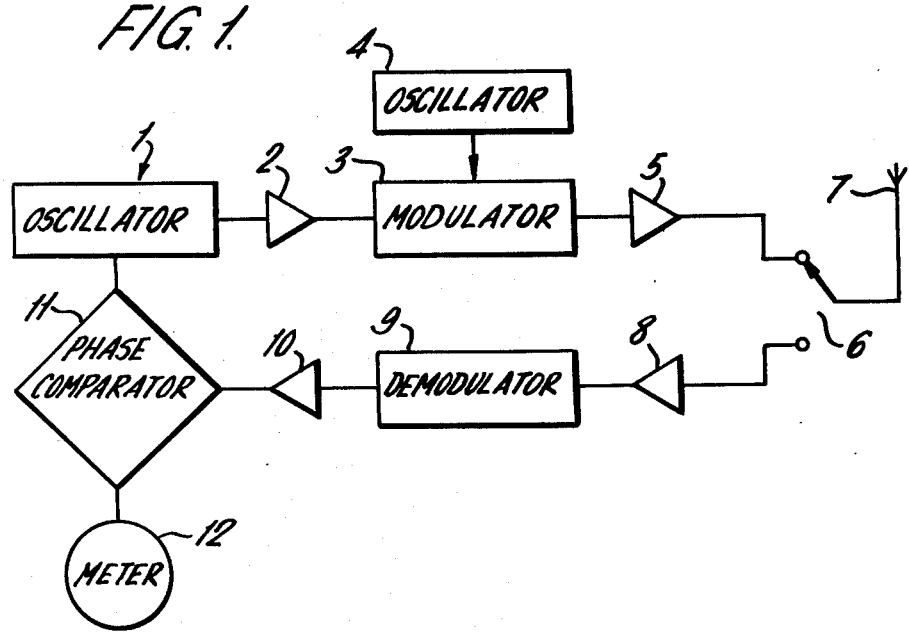
FIG. 1 is a schematic diagram of one embodiment of a measuring station.

In the measuring station illustrated by FIG. 1 of the drawings, an oscillator 1 produces an audio frequency tone signal which is preamplified by an amplifier 2 and then modulated by a modulator 3 with a radio frequency signal obtained from an oscillator 4. The modulated carrier signal is amplified by an amplifier 5 and, when a switch 6 is in a "transmit" position, is radiated from an antenna 7. When the switch 6 is in its other position, the station is capable of receiving a return signal from the receiving or reflecting station, which will be described later. When the transmitting station is in the receiving mode, signals received at the antenna 7 are amplified by an amplifier 8, demodulated by a demodulator 9, the recovered modulation being amplified in an amplifier 10 and fed to a phase comparator 11 where the phase of the modulation is compared with the modulation of the audio frequency signal; the phase difference, which indicates range, is displayed on a suitably calibrated meter 12.

The station of FIG. 1 could be used in conjunction with a comparatively simple receiver which receives the signal radiated from the measuring station, and remodulates a secondary carrier wave of different frequency to the primary carrier wave. It is very desirable that such a station should include phase correctors which ensure that the modulating signal is retransmitted in the same phase as it is received.

Figure 2:
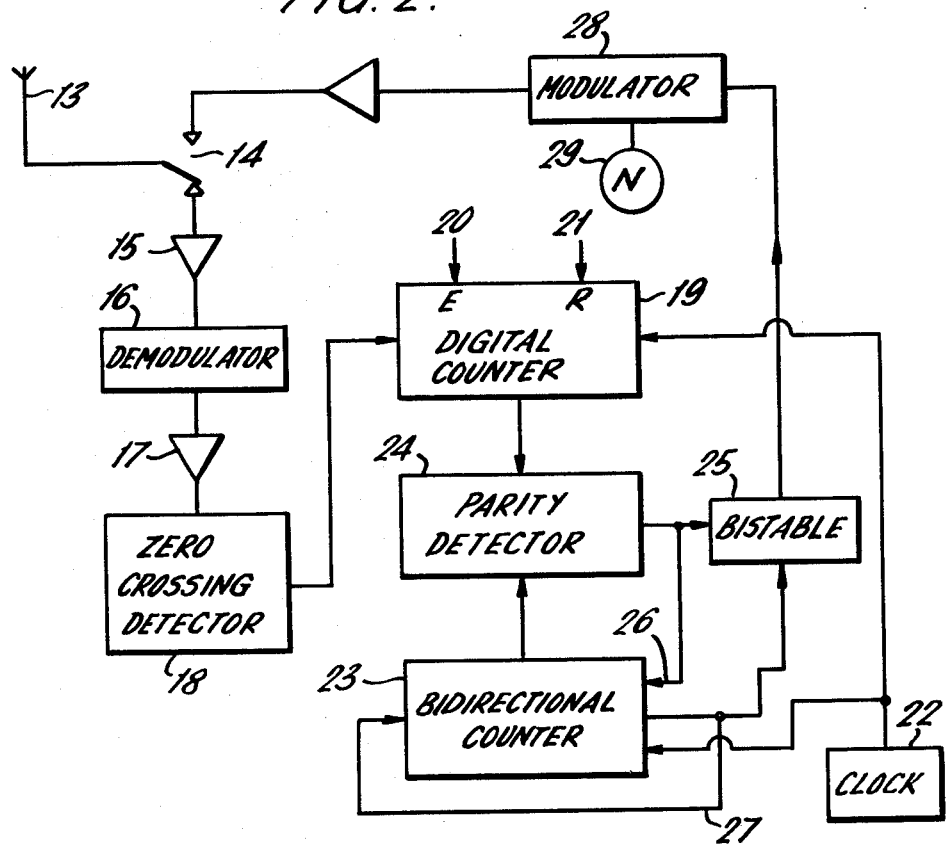
FIG. 2 is a schematic diagram of one embodiment of a receiving station.

However, a preferred embodiment of the receiving or reflective station is illustrated in FIG. 2. This station has an antenna 13 coupled to a transmit/receive switch 14 which, when in a receive mode, feeds the received signal through a preamplifier 15 to a demodulator 16. The demodulated signal is amplified by an amplifier 17 and fed to a zero crossing detector 18 which can provide a pulse output for each time when the modulating signal crosses its zero axis. These pulses are fed to a digital counter 19 which when enabled by a signal on a line 20, which may be controlled by a manual switch, starts to count high frequency clock pulses from a clock pulse generator 22. On reception of a second pulse obtained from a zero crossing of the recovered modulating signal, the counter stops, the count being retained until the counter is reset by an input on a line 21, which may be controlled by a manually operable switch.

The digital clock 22 feeds a bi-directional counter 23. A parity detector 24 is operable to detect parity of the contents of the counters 19 and 23. When parity is detected, the detector 24 signals a bistable 25 and puts that bistable in one of its two possible states. The detector also by means of a line 26 causes the counter 23 to reverse its direction of count. When this counter counts down to zero, it is automatically restarted in a reverse direction by a signal on line 27, which is coupled also to the bistable to change the state thereof. It will be observed that the bistable 25 changes state at a frequency corresponding to the zero crossings. It is readily possible to ensure, by means of a suitable connection between the detector 18 and the counter 19 that the bi-directional counter operates either in phase with or in fixed phase relationship to the accumulation of pulses by the digital counter 19 so that the signal represented by the changing states of the bistable 25 is in fixed phase relationship with the demodulated signal received by the detector 18.

The output of the bistable 25 is converted to modulation of a carrier wave by means of a modulator 28 which is connected to a radio frequency oscillator 29. The output of the modulator is coupled to the switch 14, which connects the modulated carrier signal to the antenna when the switch 14 is in the "transmit" position.

One particular advantage of the arrangements shown in FIG. 2 is that the phase of the received modulation can be preserved for as long as is desirable. This renders the invention particularly suitable for use with transceivers which may only either transmit or receive at any particular time.

Figure 3:
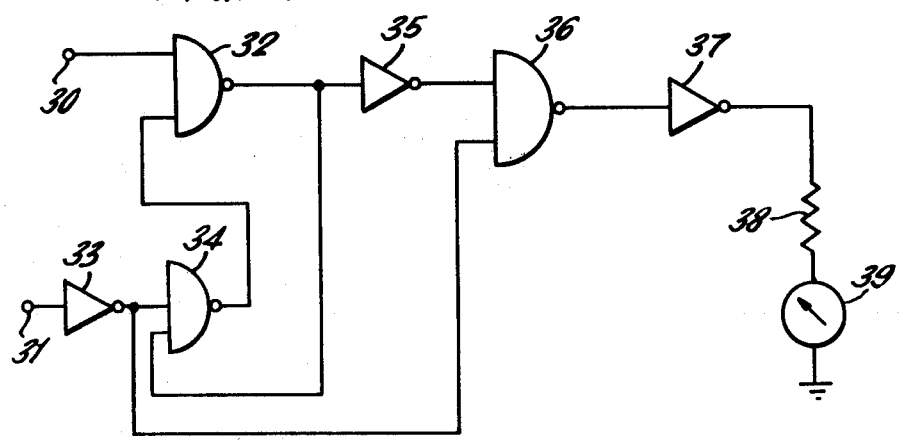
FIG. 3 indicates one form of phase comparator for use at a measuring station.

FIG. 3 illustrates a phase measuring and indicating arrangement suitable for use in the measuring station shown in FIG. 1. There are two inputs to the circuit, the demodulated signal obtained from the reflecting station, and a reference signal which is obtained from the oscillator 1 and is accordingly in phase with the modulation of the wave transmitted to the reflecting station. The two signals are amplified to square waves of unity mark to space ratio. The received signal is received at a terminal 30 and fed to one input of a NAND gate 32. The other signal is received at an input terminal 31, inverted by an inverter 33 and fed to one input of a NAND gate 34 of which the output feeds the other input of the NAND gate 32. The output of the NAND gate 32 feeds the other input of the NAND gate 34. Moreover, the output of the NAND gate 32 is fed through an inverter 35 to one input of the NAND gate 36 of which the second input is the inverted reference signal. The output of the NAND gate 36 is fed through an inverter 37 of which the output feeds a resistor 38 in series with a moving coil meter 39.

The various NAND gates and inverters may be constituted by a single integrated circuit of known form. If the amplifiers available in such an integrated circuit are insufficiently powerful to drive the resistor 38, a supplementary amplifier must be included for that purpose.

The purpose of the arrangement of FIG. 3 is to provide firstly that there is an indication on the meter only when both signals are available at the input terminals 30 and 31; that there is no reading when the first, received, signal is delayed by more than 180° relative to the reference signal; and that the phase lag between the two signals is indicated on the meter in proportion to the time difference between the end of the positive portion of the reference signal and the end of the positive portion of the received signal. A logic 1 output occurs during this time period only and the succession of logical 1's, each of which proportional to the time difference, is integrated by the moving coil meter into a steady meter reading. The meter is, as previously mentioned, calibrated to indicate distance.

When the phase difference between the two input signals is less than 180°, there will be a period when both inputs are at logic "1" that is to say positive. It is arranged that the gate 32 should return to a logic 0 state during this period and, because of the feedback through the gate 34, will remain at logic 0 and the reference signal returns to logical 0. During the period when the gates 32 and 34 have latched, but the signal received at terminal 30 is still logic 1, the inputs to the gate 36 are logic 1 and therefore the amplifier 37 has an output of logical unity.

If the inputs are reversed, then the output is proportional to phase differences lying between 180° and 360°; thus the reversal of the inputs provides a means of extending the range of measurement.

It is possible to use, in place of the moving coil meter, a resistance-capacitance network having a time constant between one tenth and one fifth of a second, the meter being supplanted by an ordinary digital volt meter responding to the output of the aforementioned network. If the moving coil meter is used, it may be arranged so that a 100 millivolt indication represents 100 miles.

Figure 4:
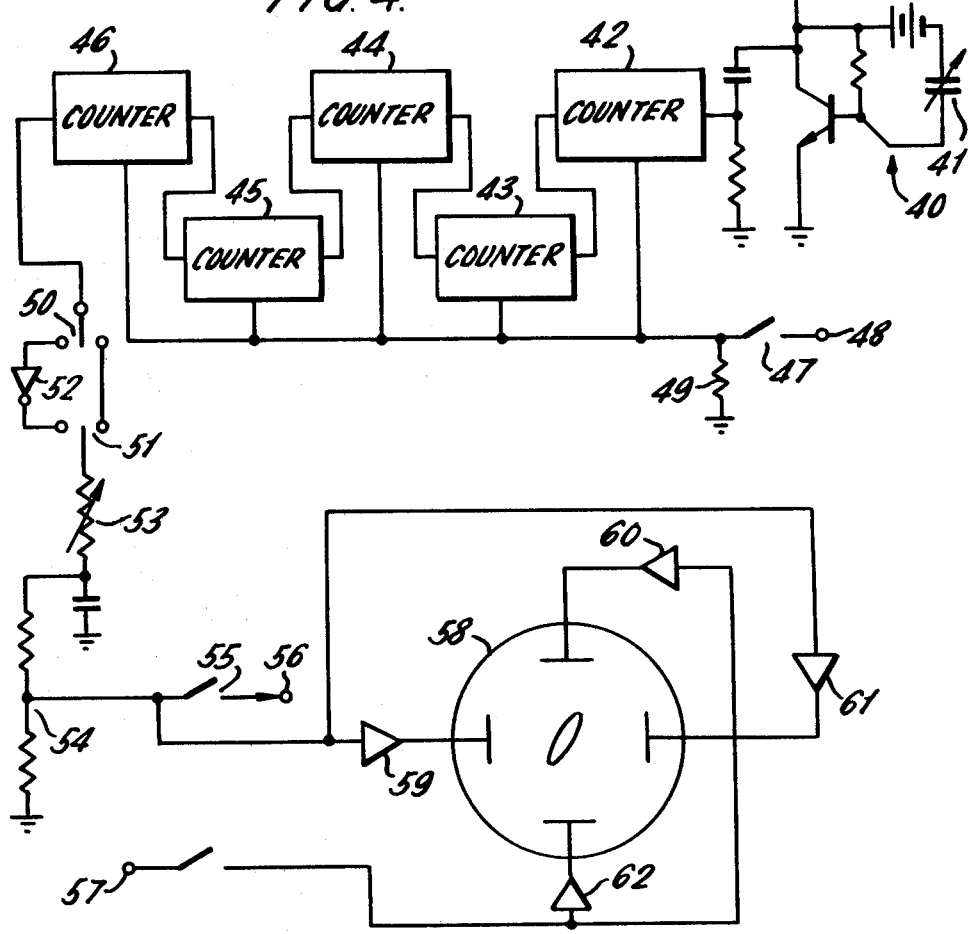
FIG. 4 is an arrangement for indicating the phase synchronism of transmitted and received signals.

FIG. 4 illustrates an arrangement which can be used in a reflecting station. An oscillator 40 includes a variable capacity 41. The output of the oscillator is divided in frequency by five binary dividers, preferably of type 74LS90. The dividers 42, 43 and 46 may divide by ten and the dividers 44 and 45 divide by five. The oscillator frequency may be 10 MHz and the final output be 400 Hz but other frequencies or division ratios may be used if desired.

The output from the final divider 46 fed through a pair of two-way switches 50 and 51, the purpose of which is to provide optional phase reversal by means of an inverter 52 if desired. The divider's output is, after phase reversal if required, fed to a variable RC circuit 53 so that it is converted into a sine wave; the resistor may be varied in order to vary the phase of the (audio frequency) signal. The signal is fed via voltage divider 54 and a switch 55 to a terminal 56 connected to the aerial of the receiving station. A further output of the voltage divider is fed via amplifiers 59 and 61 to respective X plates of an oscilloscope 58. A terminal 57 receives the demodulated signal and feeds it to amplifiers 60 and 62 and thence to the Y plates of the oscilloscope.

The purpose of the arrangement shown in FIG. 4 is to check, by means of the examination of the Lissajous figure which will be formed on the screen of the oscilloscope, that the frequency and phase of the modulation transmitted by the reflective station is in phase with the recovered modulation received by that station. The operator will adjust the frequency control 41 until the Lissajous figure stops rotating and then will adjust the circuit 53 until the pattern is a straight line. Thereupon the operator may switch the radio set from "receive" to "transmit", thereby closing switch 55 which connects the frequency and phase adjusted wave to the transmitter.

The phase of the measuring wave can be altered, after the frequencies have been matched, by the application of a positive potential through a switch 47, coupled to a positive terminal 48, to the reset terminals of all the counters. When the switch 47 is released, the counters recommence counting from zero. Alternatively, this switch can connect one or a series of positive pulses derived from the received signal to the counters until phase synchronization is obtained. This synchronization does not affect the oscillator 40 which remains highly stable so that the phase equality once established, remains after the synchronization is removed.

The arrangements shown in FIG. 4 are suitable also for use in a measuring station. In this case, the control 41 and the control 53 would be preset to standardised settings. No oscilloscope would normally be installed at a measuring station, but the inputs which are in FIG. 4 apply to the X and Y inputs of the oscilloscope become the reference and signal inputs of the phase measuring device such as is shown in FIG. 3. A station of the type shown in FIG. 2 can be arranged to sum the total number of clock pulses over a number of cycles of measuring and to divide this total by the number of cycles but the digital storage required for effective reduction of the effect of noise bursts of the duration commonly encountered on radio paths would normally be quite large.

A further device which may be useful in the system comprises a wheel or drum which is rotated at a convenient constant speed by a synchronous motor driven from a suitable power source. The drum carries a magnetic tape around its periphery. A recording/erase head and a playback head are disposed adjacent different parts of the drum. Received signals at the measuring frequency pass through a band-pass filter and into an amplifier which causes a relay to be operative during the period when the measuring wave is received. This relay switches the received signal to the recording head, any existing signal on the tape being erased. At the conclusion of the measuring wave, recording ceases and the release of the relay causes the equipment to be placed in the transmit mode for a predetermined period, during which the recorded signal is played back from the tape. The purpose of this arrangement is merely to receive and retransmit automatically, after a predetermined delay, the signal received from the measuring station.

I claim:

1. A distance measuring system comprising a first measuring station which includes means for transmitting a first modulated carrier wave, means for receiving a second modulated carrier wave and means for comparing the phases of the modulations of the first and second waves to derive an indication of distance; and a second measuring station which comprises:
   means for receiving the first modulated carrier wave;
   means for retransmitting the second modulated carrier wave, the modulation of the second carrier wave being in phase with the modulation of the primary carrier wave; and means for preserving the phase of the modulation of said first carrier wave for a longer period than the reception of that modulation by the second station, which preserving means comprises:
   a zero crossing detector responsive to the primary carrier wave to derive time impulses;
   a source of clock pulses;
   a first digital counter for accumulating clock pulses under the control of the said time impulses;
   a bi-directional counter which is arranged to increment and decrement alternately with a count corresponding to that accumulated in an interval between said time impulses by the first counter;
   a bistable means which is arranged to change state at the times when the bi-directional counter reverses its direction of count so as to provide a signal in fixed phase relationship with the said zero crossings; and,
   means for converting the latter signal into the modulation for the secondary carrier wave.

* * * * *